US006129061A

United States Patent [19]

Okuda et al.

[11] Patent Number: 6,129,061

[45] Date of Patent: Oct. 10, 2000

[54] APPARATUS FOR CONTROLLING ROTATIONAL PHASE

[75] Inventors: Tsunehisa Okuda; Yoshiyuki Shinya; Tsutomu Shimizu; Yasuaki Hasegawa; Toshihide Yamamoto, all of Hiroshima-ken, Japan

[73] Assignee: Mazda Motor Corporation, Hiroshima-ken, Japan

[21] Appl. No.: 09/196,930

[22] Filed: Nov. 20, 1998

[30] Foreign Application Priority Data

Nov. 21, 1997 [JP] Japan .................................... 9-321507
Mar. 26, 1998 [JP] Japan .................................. 10-079601

[51] Int. Cl.$^{7}$ .............................. F16D 27/00; F01L 1/344

[52] U.S. Cl. .................................... 123/90.17; 123/90.31; 74/568 R; 464/2; 464/160

[58] Field of Search ............................. 123/90.15, 90.17, 123/90.31; 74/568 R; 464/1, 2, 160

[56] References Cited

U.S. PATENT DOCUMENTS

| | | | |
|---|---|---|---|
| 5,174,253 | 12/1992 | Yamazaki et al. | 123/90.17 |
| 5,293,845 | 3/1994 | Yamazaki et al. | 123/90.17 |
| 5,680,836 | 10/1997 | Pierik | 123/90.17 |
| 5,680,837 | 10/1997 | Pierik | 123/90.17 |
| 5,860,328 | 1/1999 | Regueiro | 74/568 R |
| 5,941,202 | 8/1999 | Jung | 123/90.17 |

FOREIGN PATENT DOCUMENTS

| | | |
|---|---|---|
| 0 254 058 | 1/1988 | European Pat. Off. . |
| 41 01 676 | 7/1992 | Germany . |
| 4-232312 | 8/1992 | Japan . |
| 8-021214 | 1/1996 | Japan . |
| 10-274011 | 10/1998 | Japan . |

*Primary Examiner*—Weilun Lo
*Attorney, Agent, or Firm*—Sidley & Austin; Hugh A. Abrams

[57] ABSTRACT

An apparatus for controlling a rotational phase is disclosed. The apparatus comprises an input member provided so as to be rotatable, an output member co-axially provided with the input member so as to be rotatable, a planetary gear mechanism co-axially provided with the input member and the output member for connecting the input member with the output member, the planetary gear mechanism including three elements, namely a sun gear, a planetary carrier supporting planetary gears and a ring gear, a drive apparatus connected with one of the three elements of the planetary gear mechanism for shifting a rotation phase, the drive means including two members which are rotatable with respect to each other. One of the input member and the output member is connected with the ring gear, and the other of the input member and the output member is connected with the planetary carrier. The two members of the drive apparatus is co-axially provided with the planetary gear mechanism. One of the two members is secured to the fixed side, and the other of the two members is connected with the sun gear.

11 Claims, 11 Drawing Sheets

APPARATUS FOR CONTROLLING ROTATIONAL PHASE

BACKGROUND OF THE INVENTION

1. Field of the Invention

The present invention relates to an apparatus for controlling a rotational phase, and in particular to an apparatus for controlling a rotational phase which may be used to control a valve timing of an automotive engine.

2. Description of the Related Art

Conventionally, an apparatus for controlling a rotational phase of an output member with respect to an input member is, for example, used to control a valve timing of an automotive engine. The engine is provided with a valve driving mechanism in which an engine rotation is transmitted through a transmitting means by a crankshaft to a camshaft and intake valves and exhaust valves are driven by the camshaft so as to open or close. In this case, a rotational phase control apparatus is installed between an input member or a cam pulley connected with a crankshaft and an output member or the camshaft.

Such rotational phase control apparatus is, for example, disclosed in Japanese patent unexamined publication No. 4-232312. The apparatus in this patent publication is provided with a planetary gear mechanism between a camshaft and a cam pulley. The planetary gear mechanism is provided with a sun gear, planet gears supported by a planetary carrier, and a ring gear. The ring gear is connected with the cam pulley, and the planet carrier is connected with the camshaft. Further, the sun gear is connected with a sleeve at whose rear end a driving force receiving gear is installed. On the other hand, an engine body is provided with a step motor and the shaft of the step motor is provided with a worm thereon to mesh with the driving force receiving gear.

In the above-mentioned apparatus, when the sun gear is stopped, the camshaft rotates with a constant speed reducing ratio with respect to the cam pulley. When the sun gear is driven through the worm or the like by the step motor, the phase of the camshaft is shifted.

In the conventional apparatus mentioned above, the planetary gear mechanism is installed on the end of the camshaft, and the motor is located such that the shaft of the motor extends vertically to the camshaft. The worm provided on the motor shaft is meshed with a relatively large gear which is provided on the rear end of the sleeve connected with the sun gear of the planetary gear mechanism. Therefore, some problems exist in the conventional apparatus. Namely, it is complicated to install the motor and the like. Further, since a space for the installment of the step motor, the worm and the like is necessary in the side portions of the camshaft, it is difficult for the driving mechanism of the valves including the rotational phase control apparatus to be downsized.

SUMMARY OF THE INVENTION

It is therefore an object of the present invention to provide an apparatus for controlling a rotational phase in which a phase shift drive means and the like can be easily installed.

It is another object of the present invention to provide an apparatus for controlling a rotational phase in which a planetary gear mechanism and a phase shift drive means having a part connected with the planetary gear mechanism can be integrally installed within a compact space with respect to input and output members.

The above object is achieved according to the present invention by providing an apparatus for controlling a rotational phase comprising, an input member provided so as to be rotatable with respect to a fixed side, an output member co-axially provided with the input member so as to be rotatable with respect to the fixed side, a planetary gear mechanism co-axially provided with the input member and the output member for connecting the input member with the output member, the planetary gear mechanism including three elements which are a sun gear, a planetary carrier supporting planetary gears and a ring gear, drive means connected with one of the three elements of the planetary gear mechanism for shifting a rotation phase, the drive means including two members which are rotatable with respect to each other, one of the input member and the output member being connected with the ring gear, the other of the input member and the output member being connected with the planetary carrier, and the two members of the drive means being co-axially provided with the planetary gear mechanism, one of the two members being secured to the fixed side and the other another of the two members being connected with the sun gear.

According to the present invention, when the sun gear of the planetary gear mechanism is stopped, the output member rotates with a constant speed ratio corresponding to the rotation of the input member. On the other hand, when the sun gear is driven by the drive means so as to be rotated, the speed ratio of the ring gear to the planetary carrier is changed so as to shift the rotational phase in comparison with the condition in which the sun gear is stopped.

Thus, the rotational phase control can be carried out. Further, since the planetary gear mechanism and the drive means are co-axially provided with the input member and the output member, the apparatus can be downsized and thus easily installed.

In a preferred embodiment of the present invention, the other member of the drive means is a rotor, and the apparatus further comprises speed reducing means provided between the rotor and the sun gear of the planetary gear mechanism, the rotor, sun gear and speed reducing means being all co-axially provided.

When the speed reducing means is thus provided, the rotation speed of the rotor of the drive means is reduced and transmitted to the sun gear and therefore the driving torque of the drive means is decreased and the phase control operation can be carried out with accuracy.

In another preferred embodiment of the present invention, the speed reducing means is movable in an axial direction and includes a slide member which is provided so as to penetrate into the center of the rotor, the slide member and a corresponding portion of the rotor are respectively provided with feeding threads for converting a rotation of the rotor into an axial movement of the slide member, the sun gear is attached to the slide member and includes a helical gear for converting the axial movement into a rotation, and the feeding threads and the helical gear respectively have lead angles such that a speed of the rotor is reduced and transmitted to the planetary gear mechanism.

In the embodiment in which the speed reducing means is provided, the lead angles of the feeding threads are preferably provided to be smaller than that of the helical gear and also provided to be equal to or less than lead angles at which a rotation force, corresponding to a thrust force, and a friction force are balanced.

According to the above embodiment, since the lead angles of the feeding threads are smaller than that of the helical gear, the speed of the rotor is reduced and transmitted to the planetary gear mechanism. Further, when the drive means is stopped, the rotor can be maintained to be stopped against the reaction force from the output member by the friction force of the feeding threads.

In still another preferred embodiment of the present invention, the apparatus further comprises a secondary planetary gear mechanism provided between the planetary gear mechanism and the drive means for reducing the speed of the rotor of the drive means and transmitting the reduced speed to the sun gear of the planetary gear mechanism. In another preferred embodiment of the present invention, the apparatus further comprises clutch means for switching between a first condition and a second condition, the first condition being that the two members of the drive means are allowed to be rotatable with respect to each other and the second condition being that the two members of the drive means are not allowed to be rotatable with respect to each other, the clutch means being operated such that the two members of the drive means are in the second condition when the drive means is stopped.

In still another preferred embodiment of the present invention, the apparatus may be used to control the valve timing of the valve drive mechanism of the engine. In this embodiment, the input member is a pulley connected through a transmitting member with a crankshaft of an engine, the output member is a camshaft for driving valves, the pulley and the camshaft are co-axially provided to be rotatable with respect to the fixed side which is an engine body, and the one of the two members of the drive means is secured to the engine body.

According to the above embodiment, the valve timing can be changed by the rotational phase of the camshaft being shifted. Further, the rotational phase control apparatus can be installed within a small space at the end of the camshaft. Since the one member of the drive means is secured to the engine body, the part of the weight of the drive means and the like, which are to be installed to the end at the camshaft, is supported by the engine body. As a result, a large load is not applied to the camshaft, and the camshaft therefore can be operated smoothly.

In the embodiment in which the apparatus is used in the valve drive mechanism of the engine, the pulley is preferably connected with the ring gear of the planetary gear mechanism, and the camshaft is preferably connected with the planetary gears of the planetary gear mechanism.

In the valve drive mechanism of the engine, the camshaft needs to be provided so as to be rotated with a constant speed reducing ratio weth respect to the crankshaft. In the above embodiment, the speed is therefore reduced between the pulley and the camshaft. Accordingly, the speed reducing ratio of the crankshaft to the pulley can be small and the diameter of the pulley therefore can be small.

In still another preferred embodiment of the present invention, the drive means is an electric motor, and the two members of the drive means are a stator with coils for generating a magnetic field and a rotor with a permanent magnet, the stator being secured to the fixed side.

In the above embodiment, the rotational phase of the output member is controlled by the electric motor.

In the embodiment, the electric motor is preferably a step motor whose rotor is connected through the speed reducing means with the sun gear of the planetary gear mechanism. In this case, the phase shift angle of the output member can be small so as to correspond to the one step of the step motor, and the resolution can be improved. The step motor of the present invention is defined as a motor, which is operated stepwise, including a step motor, a DC brushless motor and the like.

In another preferred embodiment of the present invention, the drive means is a hydraulic motor, and the two members of the drive means are a casing member which has a hydraulic chamber therein and a rotor located in the casing member.

The above and other objects and features of the present invention will be apparent from the following description by taking reference with accompanying drawings employed for preferred embodiments of the present invention.

BRIEF DESCRIPTION OF THE DRAWINGS

In the accompanying drawings:

FIG. 5 is a view showing the feeding thread of a slide member, which is speed reducing means, the lead angle of a sun gear and the like;

DETAILED DESCRIPTION OF THE PREFERRED EMBODIMENTS

Hereinafter, the preferred embodiments of the present invention will be explained with reference to the drawings.

First, a first embodiment of the present invention will be explained with reference to FIGS. 1–6.

Figure 1:
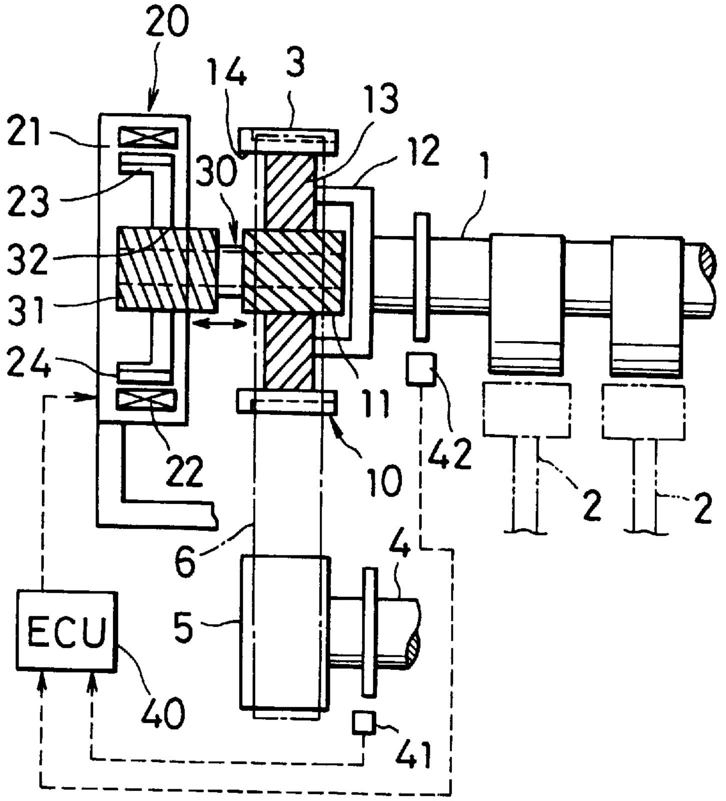
FIG. 1 is a schematic view of an apparatus for controlling a rotational phase according to a first embodiment of the present invention.

FIG. 1 is a schematic view of an apparatus for controlling a rotational phase according to a first embodiment of the present invention. In the embodiment shown in FIG. 1, the apparatus for controlling a rotational phase is applied to a variable valve timing apparatus which is installed into a valve drive mechanism of an automotive engine. A reference numeral 1 designates a camshaft which is rotatably supported by an engine body (not shown) and operates intake and exhaust valves 2 to open and close them. A cam pulley 3 which is a timing pulley or a pulley with teeth is located around the end of the camshaft 1 and connected through a timing belt 6 with a crank pulley 5 attached on the end of a crankshaft 4. In this embodiment, the camshaft 1 corresponds to an output member and the cam pulley 3 corresponds to an input member.

A planetary gear mechanism 10 and an electric motor 20 which is a phase shift drive means are installed on the end of the camshaft 1 coaxially with both the camshaft 1 and the cam pulley 3.

Figure 2:
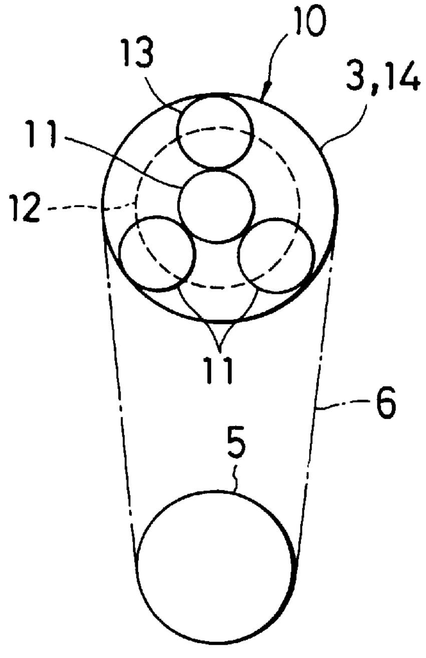
FIG. 2 is a schematic view of a planetary gear mechanism of the apparatus for controlling a rotational phase.

Referring to FIG. 2, the planetary gear mechanism 10 includes a sun gear 11, a planetary carrier 12 (herein after called a carrier) supporting a plurality of planetary gears 13, and a ring gear 14. These three components, the sun gear 11, the carrier 12 and the ring gear 14 are rotatably co-axially arranged with respect to each other. The cam pulley 3 is connected with the ring gear 14, and the carrier 12 is secured to the end of the camshaft 1.

The electric motor 20 includes a stator 21 and a rotor 23. The stator 21 is fixed to the engine body, and the rotor 23 is connected through a speed reducing mechanism with a sun gear 11 of the planetary gear mechanism 10. In the embodiment, the speed reducing mechanism includes a slide member 30 which is movable along the axial direction, and the sun gear 11 is connected with the slide member 30. As explained hereinafter in detail, the rotation of the rotor 23 is converted into the movement of the slide member 30 in the axial direction by feeding threads 31 and 32 which are provided on the rotor 23 and the slide member 30. Thereafter, the axial direction movement of the slide member 30 is converted into the rotation and transmitted to the planetary gear mechanism 10 by a helical gear provided on the sun gear 11.

Figure 3:
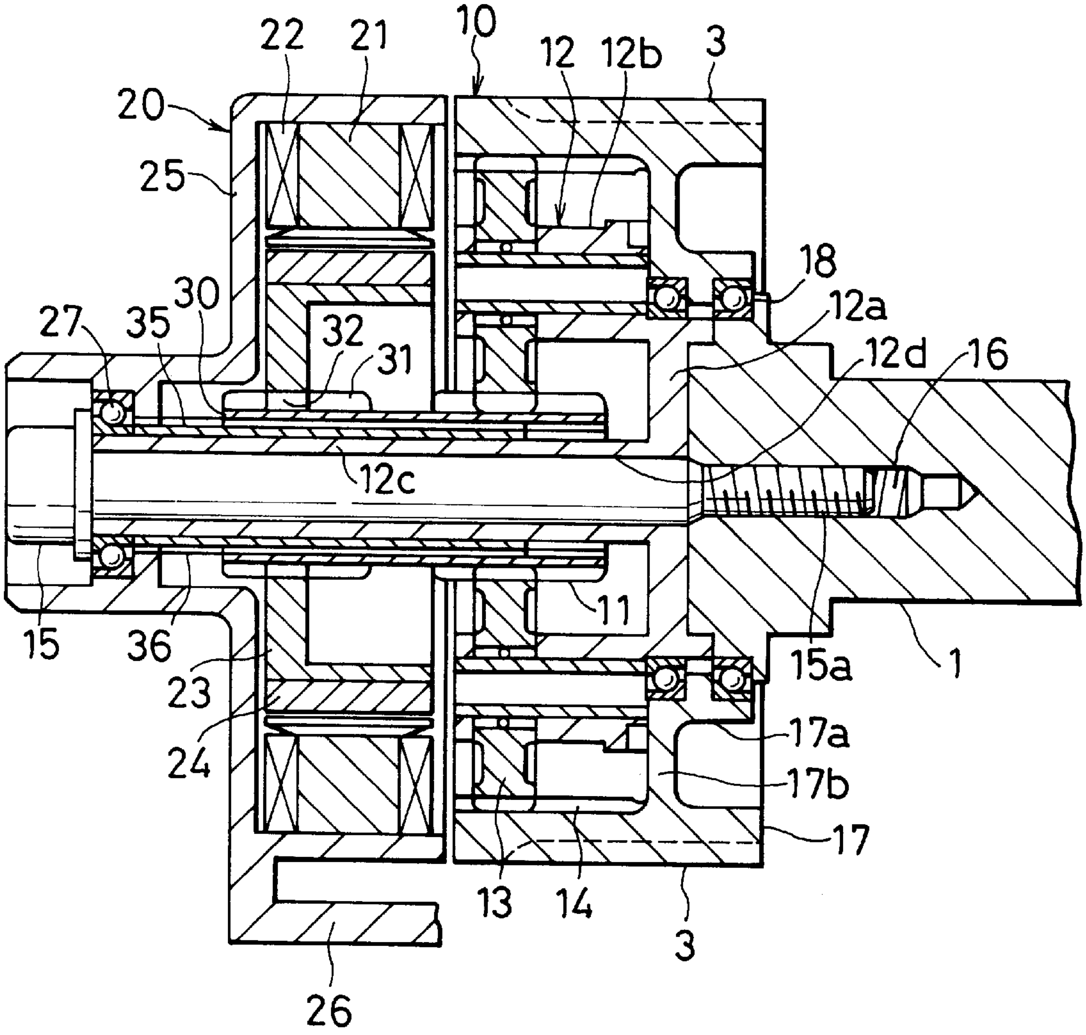
FIG. 3 is a sectional view of the apparatus for controlling a rotational phase according to the first embodiment.
Figure 4:
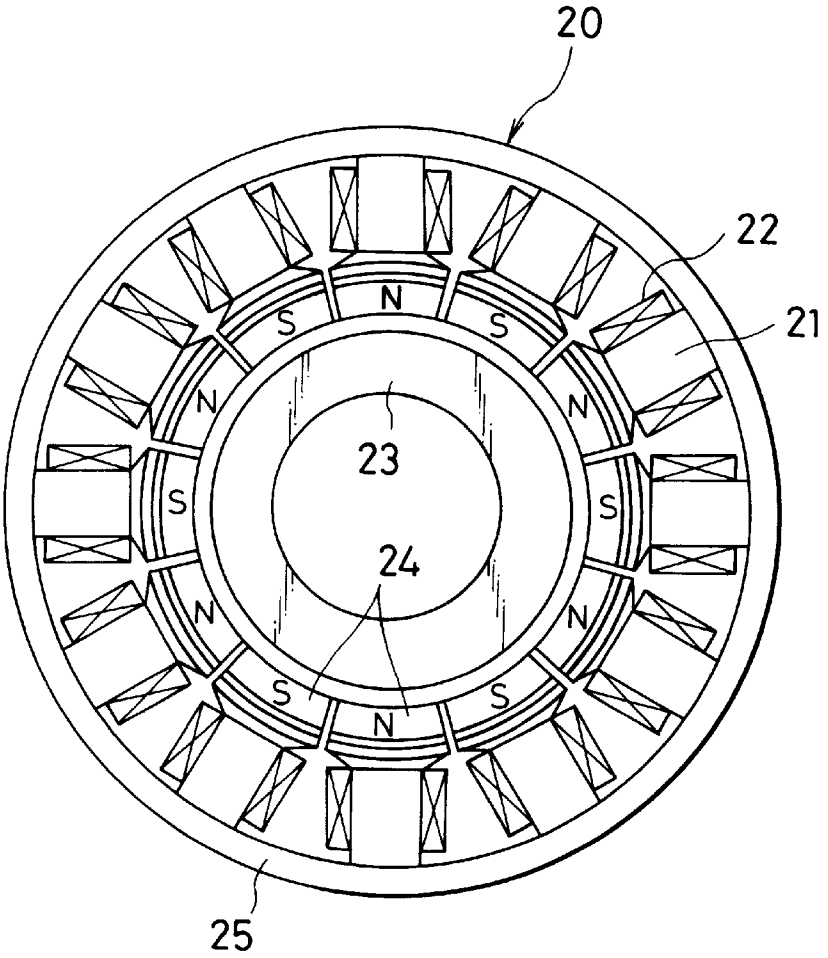
FIG. 4 is a front view of an electric motor which is drive means for shifting a rotational phase.

The rotational phase control apparatus will be explained in detail with reference to FIGS. 3 and 4. The carrier 12 of the planetary gear mechanism 10 is integrally provided with a rear wall 12*a*, which is formed so as to fit onto the front end of the camshaft 1, a plurality of boss portions 12*b* on the circumference thereof, and a sleeve 12*c* which is formed on the inner circumference of the rear wall 12*a* and extends toward the front side. A through hole 12*d* is formed in the rear wall 12*a* and the sleeve 12*c*. A threaded shaft body 15 penetrates into the through hole 12*d* and a front thread portion 15*a* of the shaft body 15 is threadly engaged with a thread hole 16 formed in the camshaft 1. Thus, the shaft body 15 together with the carrier 12 is secured to the camshaft 1. The boss portions 12*b* of the carrier 12 support the planetary gears 13 so as to be rotatable.

The ring gear 14 and the cam pulley 3 are integrally connected each other, and an inner cylindrical portion 17*a* supported by the camshaft 1 is further integrally connected with the ring gear 14 and the cam pulley 3. Namely, a cylindrical member 17 having a predetermined diameter is provided with the cam pulley 3 formed on the outer circumference thereof, the ring gear 14 formed on the front side inner circumference thereof and the inner cylindrical portion 17*a* having a connecting wall 17*b*. The inner cylindrical portion 17*a* of the cylindrical member 17 is supported through a bearing 18 by both the camshaft 1 and the carrier 12 fixed to the camshaft 1.

The electric motor 20 is for example a step motor including a stator 22 on which stator coils for generating a magnetic field are wound and a rotor 23 having permanent magnets 24. The stator 22 is attached into a ring-shaped casing 25, and a bracket 26 formed integrally with the casing 25 is secured to the engine body.

The rotor 23 is installed in an inner side of the stator 21. The shaft body 15 and the sleeve 12*c* penetrate into the center of the rotor 23 and the front ends of both the shaft body 15 and the sleeve 12*c* are supported through a bearing 27 by the casing 25.

A cylindrical guide member 35 is arranged on the outer circumference of the sleeve 12*c*, and a cylindrical slide member 30 is arranged on the outer circumference of the guide member 35. The guide member 35 is secured to the casing 25 and thus is fixed to the engine body. Splines 36 or serrations are correspondingly formed in an axial direction on the outer circumference of the guide member 35 and the inner circumference of the slide member 30. By the engagement of the splines 36 of both members 30 and 35, the slide member 30 can move in the axial direction under the condition that its rotation is prohibited.

The front portion of the slide member 30 is located in the center of the electric motor 20, and a feeding thread 31 like a helical spline is formed on the outer circumference of the front portion of the slide member 30. The rotor 23 is provided with a thread 32 formed on the inner circumference thereof. The thread 32 of the rotor 23 is meshed with the feeding thread 31 of the slide member 30. On the other hand, the rear portion of the slide member 30 is located in the center of the planetary gear mechanism 10, and the sun gear 11 is formed integrally on the outer circumference of the rear portion of the slide member 30. The sun gear 11, the respective planetary gears 13 meshed with the sun gear 11 and the ring gear 14 meshed with the planetary gears 13 are all helical gears.

The lead angle of the feeding thread 31 is provided to be smaller than that of the helical gear of the sun gear 11 such that the rotation of the rotor 23 is reduced and transmitted to the planetary gear mechanism 10. Further, the lead angle of the feeding thread 31 is provided to be so small to maintain the stopping condition of the rotor 23 against a thrust force applied from the camshaft side to the slide member 30 when the motor 20 is not driven to be stopped. The details of the structures of the slide member 30 and the like will be explained below.

The electric motor 20 is controlled by a control unit 40 which is shown in FIG. 1. Namely, rotational phases of the camshaft 1 are determined in advance such that optimal valve timings can be obtained according to the driving conditions. The control unit 40 controls the current applied to the stator coil 22 of the motor 20 such that the rotational phase of the camshaft 1 is shifted according to the driving conditions.

In the case that the electric motor 20 is a step motor, a phase shifting amount is converted into a step number and the motor is controlled by an open control operation. Further, there are provided a crank angle sensor 41 for detecting a crank angle of the engine and a cam angle sensor 42 for detecting a cam angle. The position of the rotor is calculated based on the phase difference from the output signals of the sensors 41 and 42. When the position of the rotor is different from that which is obtained based on the step number, because of loss of synchronism of the step motor and the like, a location correction operation or a fail operation may be carried out.

In operation, during a non-phase-shifting operation, the electric motor 20 is stopped and the sun gear 11 of the planetary gear mechanism 10 is fixed. As a result, the cam pulley 3 connected with the ring gear 14 and the camshaft 1 connected with the carrier 12 are respectively rotated with a speed ratio which is determined by the numbers of the teeth of the sun gear 11 and the ring gear 14. Further, a pulley ratio of the crank pulley 5 and the cam pulley 3 is predetermined taking into consideration of the speed ratio. Thus, when the engine is a four cycle one, the camshaft 1 rotates with a 1/2 speed ratio against the crank shaft 4.

During a phase-shifting operation, the rotor 23 of the electric motor 20 is rotated, the rotation of the rotor 23 is converted into the axial direction movement of the slide member 30 and the sun gear 11 by the feeding threads 31 and 32. Then, the axial direction movement of the member 30 and the gear 11 is converted into the rotation force by the helical gears including the sun gear 11 and the like such that the rotation force is applied from the sun gear 11 to the planetary gears 13. Accordingly, the speed ratio between the ring gear 14 and the carrier 12 is changed in comparison with the condition of the sun gear 11 being fixed, and, as a result, the rotational phase of the camshaft 1 is shifted so as to vary the valve timing.

In the embodiment, the planetary gear mechanism 10 reduces the speed such that the rotation angle in the phase shift of the camshaft 1 is smaller than that into which the axial direction movement is converted by sun gear. The speed is also reduced between the electric motor 20 and the planetary gear mechanism 10. As a result, the drive force of the electric motor for generating the rotational phase change becomes small, and an accuracy in controlling the rotational phase can be improved.

The operation of the embodiment will be more specifically explained below.

In the planetary gear mechanism 10, when the ratio of the teeth number of the sun gear 11 to the ring gear 14 is 1:3, the rotation number of the carrier 12 (or the camshaft 1) is reduced to be 3/4 in comparison with that of the ring gear 14 (or the cam pulley) under the condition of the sun gear 11 being fixed. Accordingly, since when the rotation number of the camshaft needs to be 1/2 of that of the crankshaft in a four-cycle engine, a pulley ratio (or diameter of crank pulley/diameter of cam pulley) needs to be 2/3. Thus, according to this example of the embodiment, the diameter of the cam pulley can be reduced, since the pulley ratio (or diameter of crank pulley/diameter of cam pulley) is 1/2 in the conventional engine.

In this example, when the sun gear 11 is rotated, the phase angle of the camshaft is shifted in 1/4 of the rotation angle of the sun gear. More specifically, when the sun gear 11 is rotated in 4 degrees, the phase angle of the can shaft is shifted in 1 degree.

Where a planetary gear ratio which is a ratio of sun gear rotation angle to carrier rotation angle is $i_p$ and a necessary phase shift angle is $\theta_0$, for example when $i_p$ is 4 and $\theta_0$ is 30 degrees, the sun gear rotation angle is $\theta_0 \cdot i_p = 120°$. In the example of the embodiment, since the sun gear 11 is not rotated but moved in an axial direction, the sun gear 11 needs to be moved in the certain distance which corresponds to 120 degrees of the rotation of the sun gear.

Figure 5:
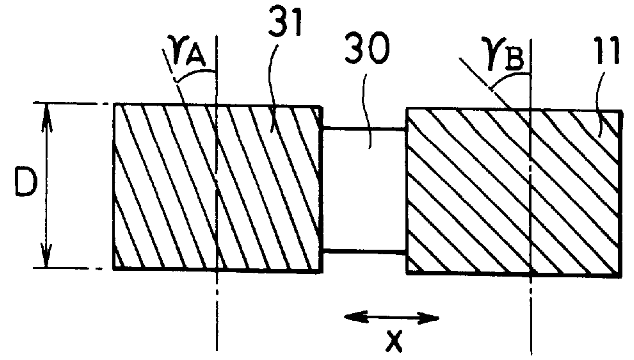

Referring to FIG. 5, when the diameter of the feeding thread 31 of the slide member 30 is D, the moving distance of the slide member 30 is x, and the lead angle, which is an angle to the direction vertical to the axial direction, of the sun gear 11 is $\gamma_B$, the equation 1 is obtained.

$$x = \pi \cdot D(\theta_0 \cdot i_p / 360°) \cdot \tan \gamma_B \quad (1)$$

For example when D=20 mm and, $\gamma_B$ is 50° and these values and $\theta_0 \cdot i_p = 120°$ are substituted in the equation 1, x=24.9 (mm) and therefore the movable distance of the slide member 30 needs to be provided so as to accept such moving distance.

A spline angle is a slant angle to the camshaft direction. The spline angles of the slide member 30 and the electric motor 20 are provided to be larger than that of the sun gear 11 such that the speed is reduced between the electric motor 20 and the planetary gear mechanism 10. By using a lead angle instead of the spline angle, when the lead angle $\gamma_A$ of the feeding thread 31 is smaller than the lead angle $\gamma_B$ of the sun gear, the speed is reduced and a helical gear ratio $i_h$ which corresponds to a speed reducing ratio is obtained by the equation 2.

$$i_h = \tan \gamma_A / \tan \gamma_B \quad (2)$$

The lead angles $\gamma_A$ and $\gamma_B$ are preferably provided such that $i_h = 10$. More specifically, when the lead angle $\gamma_B$ of the sun gear 11 is 50°, the lead angle $\gamma_A$ of the feeding thread 31 is provided to be 6.8° based on the equation 2.

Accordingly, when the helical gear ration $i_h$ and the planetary gear ratio $i_p$ are thus provided, a gear ratio as a whole is 1:40 and the speed is reduced such that the phase shift angle of the camshaft 1 becomes 1/40 to the rotation of the rotor 23. Since the speed is reduced in a very large amount, a low torque and high-speed electric motor can be efficiently employed, and the resolution of the phase control can be high. For example, when a step motor with a 1.8° step angle is used, a resolution is 0.09° in the crank angle and 0.045° in the cam angle.

Even when the electric motor 20 is stopped, a thrust force is applied to the slide member 30 by a reaction force from the camshaft 1 during an operation of the engine, and a rotational force corresponding to the thrust force is applied to the rotor 23. At this time, if the lead angle $\gamma_A$ of the feeding thread 31 is provided to be small enough, the friction force maintains the rotor 23 so as not to be rotated by the reaction force.

Figure 6:
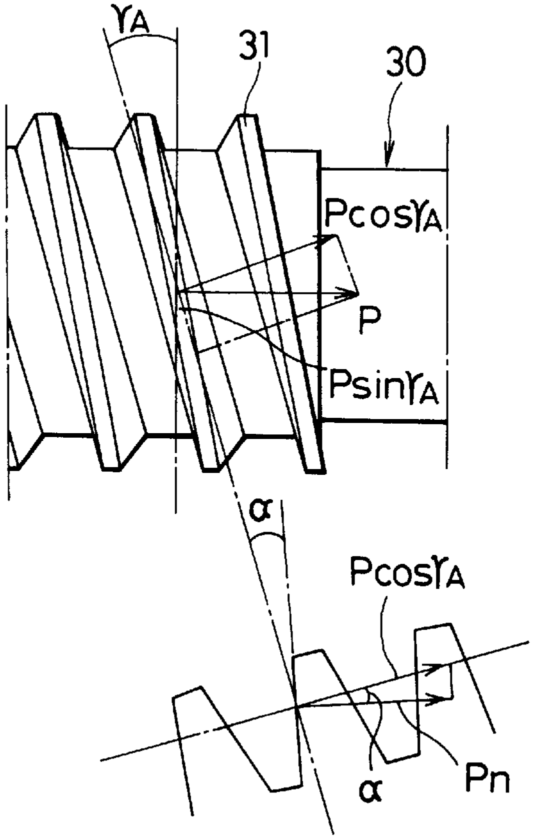
FIG. 6 is a view showing a rotation force, corresponding to a thrust force, and a friction force both of which are applied to the thread of the slide member.

Namely, as shown in FIG. 6, when a thrust force P is applied to the slide member 30, a rotational force applied to the cylindrical surface of a pitch of the feeding thread 31 is $P \cdot \sin \gamma_A$, and when a slant angle of the teeth surface in a cross section of the feeding thread 31 is $\alpha$, a vertical component $P_n$ of the force applied to the teeth surface of the feeding thread 31 is obtained by the equation 3.

$$P_n = P \cdot \cos \gamma_A \cdot \cos \alpha \quad (3)$$

Therefore, when a friction coefficient is $\mu$, the friction force is obtained by the equation 4.

$$\mu \cdot P_n = \mu \cdot P \cdot \cos \gamma_A \cdot \cos \alpha \quad (4)$$

When the friction force is balanced with the rotational force, the rotor 23 maintains a stop condition, and this relationship is expressed by the equation 5.

$$P \cdot \sin \gamma_A - \mu \cdot P \cdot \cos \gamma_A \cdot \cos \alpha = 0 \ \text{Tan}\ \gamma_A = \mu \cdot \cos \alpha \quad (5)$$

Since generally $\mu$ is nearly equal to 0.15 and $\alpha$ is nearly equal to 20°, $\gamma_A$ becomes nearly equal to 8.0° and the rotor 23 is maintained to be stopped when the lead angle of the feeding thread 31 is less than this value.

Here, when the lead angle $\gamma_A$ of the feeding thread 31 is 6.8° such that the lead angle $\gamma_B$ is 50° and the helical gear ratio $i_h$ is 10, the condition for maintaining the rotor 23 to be stopped is satisfied.

Figure 7:
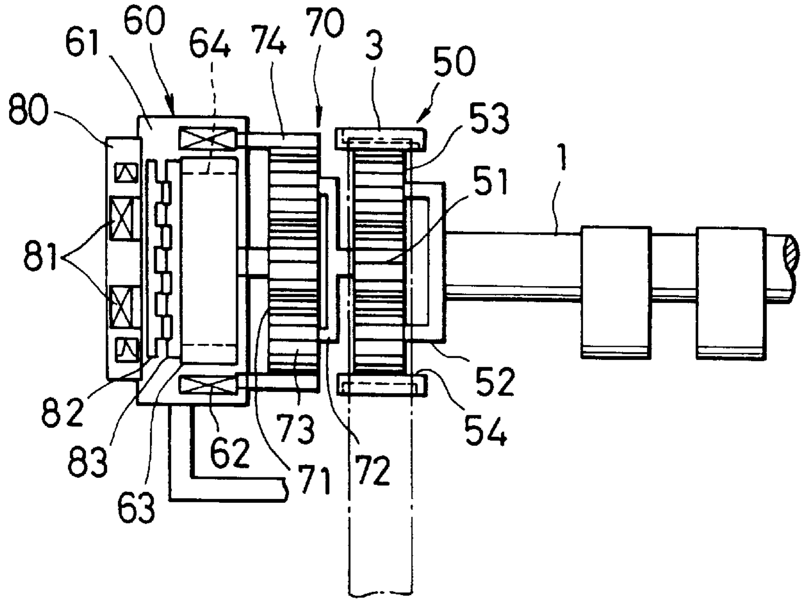
FIG. 7 is a schematic view of an apparatus for controlling a rotational phase according to a second embodiment of the present invention.
Figure 8:
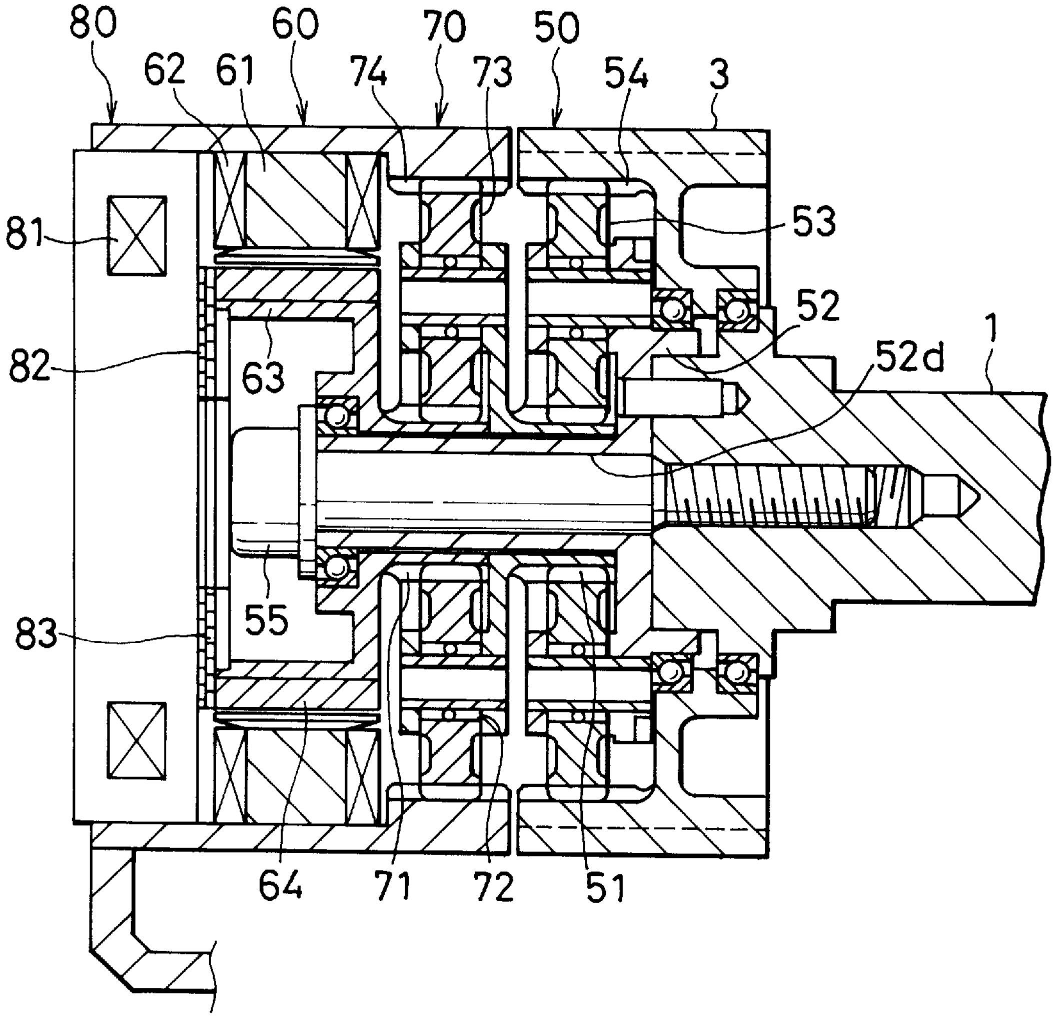
FIG. 8 is a schematic view of a planetary gear mechanism of the apparatus for controlling a rotational phase in FIG. 7.

Next, a second embodiment of the present invention will be explained with reference to FIGS. 7 and 8. FIGS. 7 and 8 show a second embodiment of the present invention. In the second embodiment, a planetary gear mechanism 50 for connecting an input member with an output member has as same structure as that shown in the first embodiment in FIGS. 1–4. Namely, the planetary gear mechanism 50 includes a sun gear 51, a carrier 52 supporting a plurality of planetary gears 53, and a ring gear 54. These three components of the sun gear 51, the carrier 52 and the ring gear 54 are rotatably co-axially arranged each other. The cam pulley 3 is connected with the ring gear 54, and the carrier 52 is secured to the end of the camshaft 1.

In the second embodiment, the sun gear 51, the planetary gears 53 and the ring gear 54 are all made out of spur gears. Further, the sun gear 51 is rotatably provided around the sleeve 55*c* which is secured to the camshaft 1 by a shaft body 55.

An electric motor 60 which is a phase shift drive means has as same structure as that shown in FIGS. 1–4 and includes a stator 61 on which a stator coil 62 is wound and a rotor 63 with a permanent magnet 64. The stator 61 is shaped to be cylindrical and is fixed to the casing which is connected through the bracket with the engine body.

In the second embodiment, a secondary planetary gear mechanism 70 is arranged between the electric motor 60 and the planetary gear mechanism 50. The secondary planetary gear mechanism 70 also includes a sun gear 71, a carrier 72 supporting a plurality of planetary gears 73, and a ring gear 74. The sun gear 71 is connected with the rotor 63, the carrier 72 is connected with the sun gear 51 of the planetary gear mechanism 50, and the ring gear 74 is secured to the engine body.

In the second embodiment, the rotational phase of the camshaft 1 is shifted by the rotation of the rotor 63 of the electric motor 60, and the rotation of the rotor 63 is reduced in a large amount by the secondary planetary gear mechanism 70 and then transmitted to the planetary gear mechanism 50. Therefore, a low torque and high speed motor can be used, and an accuracy in controlling the rotational phase can be improved. Further, the motor 20 and the planetary gear mechanisms 50 and 70 can be coaxially installed with a compact space. These advantageous effects are as same as those of the first embodiment.

In the first embodiment, the lead angles of the feed threads 31 and 32 are provided to be small so as to maintain the rotor 23 against the reaction force from the camshaft during the motor 20 being stopped. However, since the second embodiment is not provided with such feeding threads, the second embodiment does not include such structure. Therefore, in the second embodiment, there is provided an electromagnetic clutch (or clutch means) 80 on the electric motor 60.

The electromagnetic clutch 80 includes a pair of friction plates 82 and 83 provided on the fixed side and the rotor 63, and a solenoid 81 for connecting and separating the friction plates 82 and 83. When the electric motor 60 is stopped, the solenoid is operated to connect the friction plates 82 and 83 each other such that the rotor 63 is maintained to be stopped.

Here, the first embodiment, where the speed reducing mechanism has the structure shown in FIGS. 1–4, may be provided with an electromagnetic clutch when the friction resistances of the feeding threads 31 and 32 are not enough to maintain the rotor 23 being stopped.

In the present invention, a hydraulic motor may be used instead of the electric motor 20, 60 each of which is a phase shift drive means. In this variation, the hydraulic motor includes a casing defining a pressure chamber and a rotor installed within the casing. The casing is connected through a bracket with an engine body, and the rotor is connected through a speed reducing mechanism with the sun gear 11, 51 of the planetary gear mechanism 10, 50 for connecting the input member with the output member.

In the present invention, the rotor may be directly connected with the sun gear. In this variation, a speed reducing mechanism as shown in the above embodiments is preferably provided between the two in order to reduce the driving torque of the motor and to improve the accuracy in controlling the rotational phase.

In the present invention, an input member (or the cam pulley) may be connected with the carrier, and an output member (or the camshaft) may be connected with the ring gear. On the other hand, in the above-mentioned embodiments, the input member or the cam pulley is connected with the ring gear and the output member or the cam shaft is connected with the carrier. The diameter of the pulley in the embodiments is advantageously smaller than that of the variation.

A third embodiment of the present invention will be explained with reference to FIGS. 9–13.

Figure 9:
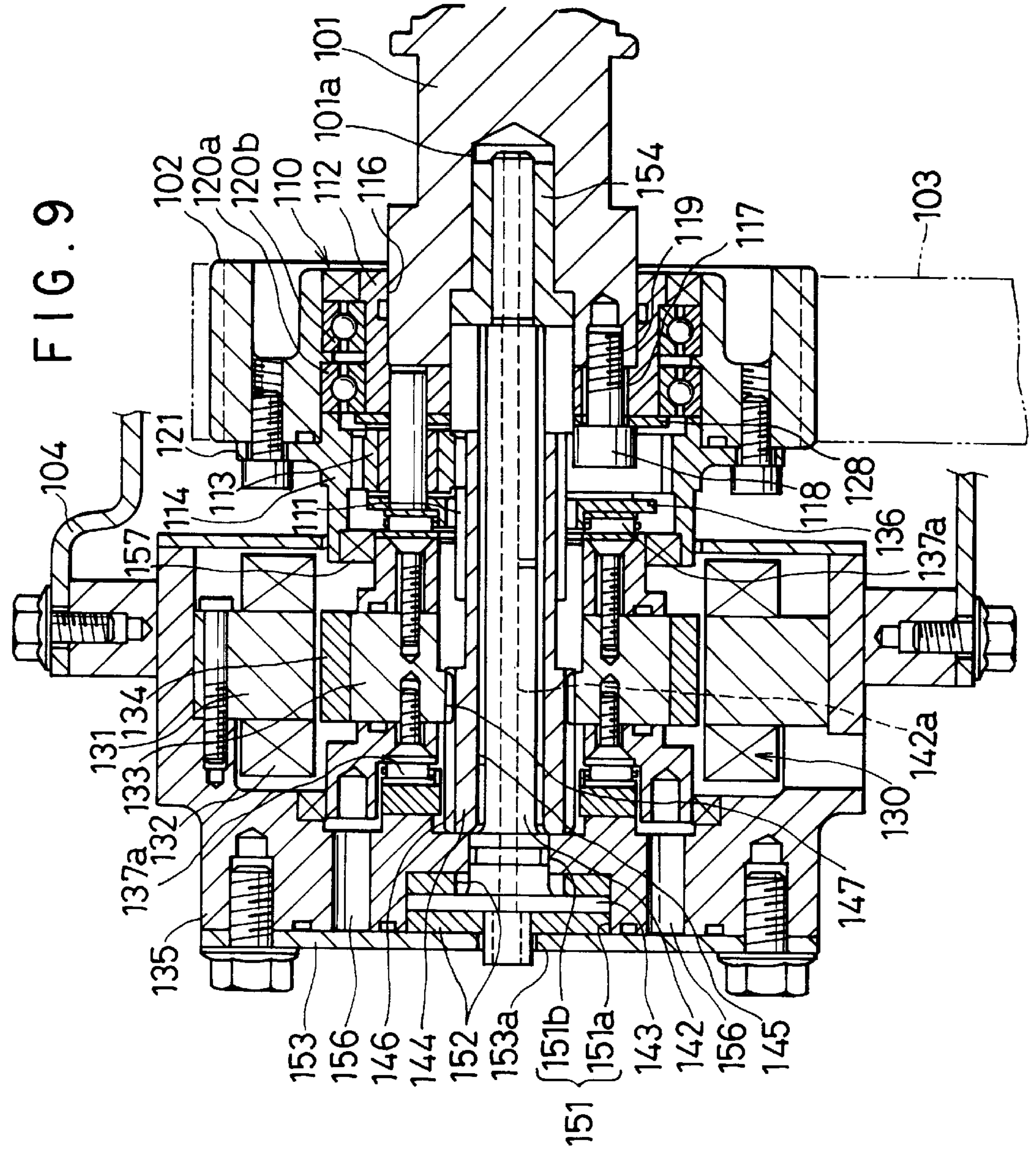
FIG. 9 is a sectional view of an apparatus for controlling a rotational phase according to a third embodiment of the present invention.

FIG. 9 is a schematic view of an apparatus for controlling a rotational phase according to a third embodiment of the present invention. In the embodiment shown in FIG. 9, the apparatus for controlling a rotational phase is also applied to a variable valve timing apparatus which is installed into a valve drive mechanism of an automotive engine. A reference numeral 101 designates a camshaft which is rotatably supported by an engine body (not shown) and operates valves to be open and close by its rotation. A cam pulley 102 which is a timing pulley or a pulley with tooth is located around the end of the camshaft 101 and connected through a timing belt 103 with a crank pulley (not shown) attached on the end of a crankshaft (not shown).

A planetary gear mechanism 110 and an electric motor 130 which is a phase shift drive means are installed on the end of the camshaft 101 co-axially with both the camshaft 101 and the cam pulley 102.

The planetary gear mechanism 110 includes a sun gear 111, a planetary carrier 112 (herein after called carrier) supporting a plurality of planetary gears 113, and a ring gear 114. These three components of the sun gear 111, the carrier 112 and the ring gear 114 are rotatably coaxially arranged each other. The cam pulley 102 is connected with the ring gear 114, and the carrier 112 is secured to the end of the camshaft 101.

The electric motor 130 includes a stator 131 and a rotor 133. The stator 131 is fixed through a casing 135 and a bracket 104 to the engine body. The rotor 133 is connected through a speed reducing mechanism with a sun gear 111 of the planetary gear mechanism 110. In the embodiment, the speed reducing mechanism includes a slide member 144 which is movable along the axial direction, and the sun gear 111 is connected with the slide member 144. As explained hereinafter in detail, the rotation of the rotor 133 is converted into the movement of the slide member 144 in the axial direction. Then the axial direction movement of the slide member 144 is further converted into the rotation and transmitted to the planetary gear mechanism 110 by helical gears provided on the sun gear 11 and the like.

Figure 10:
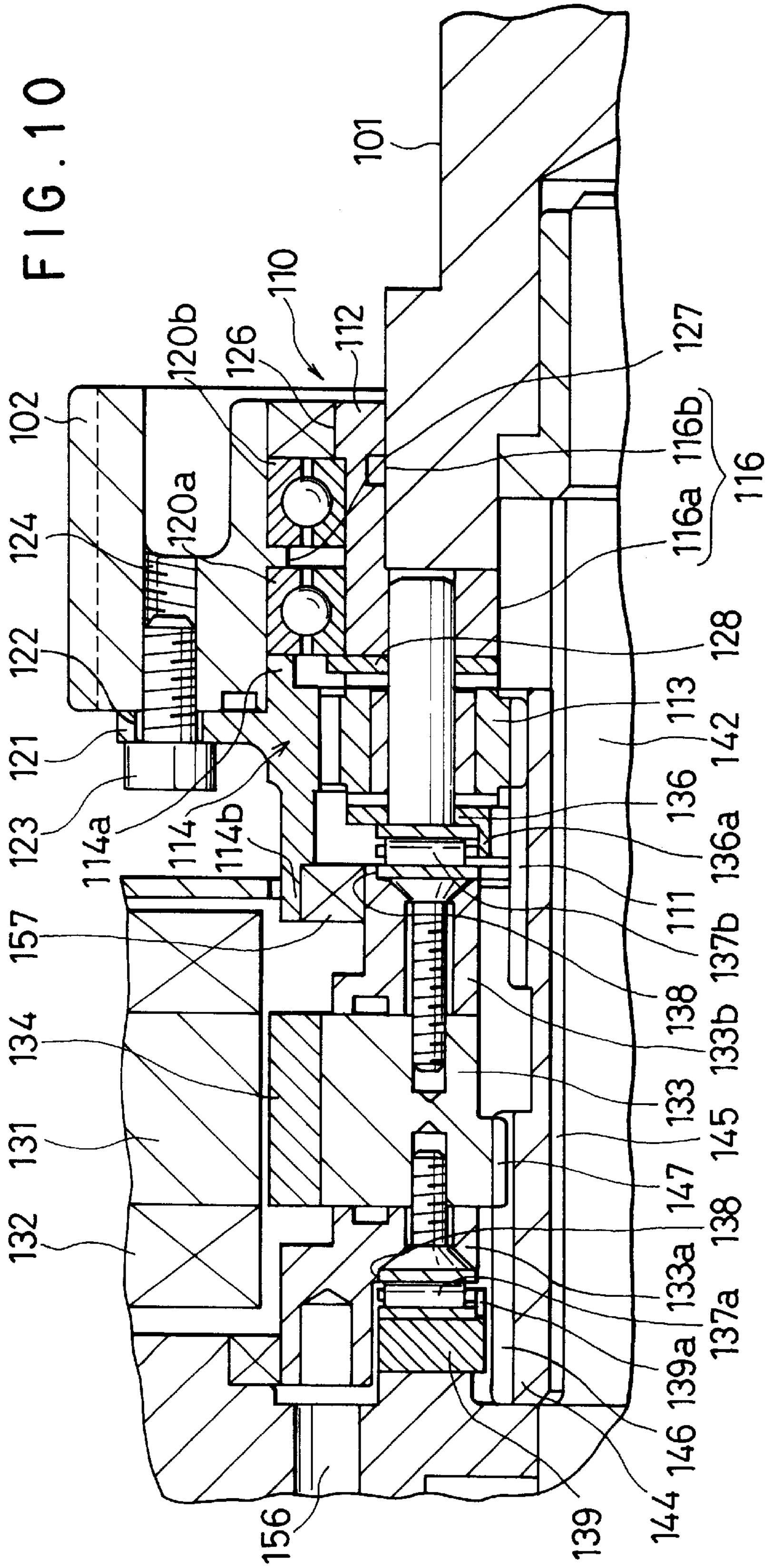
FIG. 10 is a partially enlarged sectional view of the apparatus for controlling a rotational phase in FIG. 9.

The rotational phase control applied to the variable valve timing apparatus will be explained in detail. As shown in FIG. 10, the carrier 112 of the planetary gear mechanism 110 is provided with a through hole 116 having a small diameter portion 116*a* and a large diameter portion 116*b* extending in an axial direction or a front and rear direction. The large diameter portion 116*b* of the through hole 116 is fitted onto the end of the camshaft 101. The carrier 112 is provided with a plurality of bolt holes 117 around the small diameter portion 116*a*. Bolts 18 are inserted into the bolts holes 117 and threadly engaged with thread holes 119 formed in the camshaft 101 such that the carrier 112 is connected with the camshaft 101. Thus, the carrier 112 is connected with the camshaft 101 with the carrier 112 being fitted onto the camshaft 101, and therefore the carrier 112 is positioned in the center of the camshaft 101.

Figure 11:
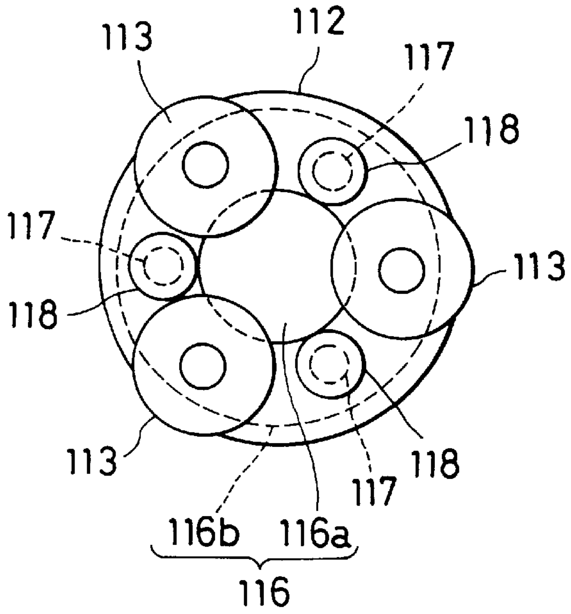
FIG. 11 is a view showing a planetary gear mechanism in the third embodiment of the present invention.

The bolt holes 117 are, as shown in FIG. 11, located around the small diameter portion 116*a* between the respective planetary gears 113. Thus, since the carrier 112 is connected with the camshaft 101 using spaces between the respective planetary gears 113, a compact connection between the carrier 112 and the camshaft 101 can be obtained.

The cam pulley 102 is arranged on the outer circumference of the carrier 112 and rotatably supported through two front and rear bearings 120*a* and 120*b* by the outer surface of the carrier 112. The ring gear 114 is integrally connected with the front end of the cam pulley 102, and the ring gear 114 is meshed with the planetary gears 113.

Referring to FIG. 10, the rear end of the ring gear 114 is fitted into the front end of the cam pulley 102, and then the cam pulley 102 and the ring gear 114 are connected each other through a flange 121 which is provided on the outer circumference of the ring gear 114. Specifically, bolts 123 are inserted from the front side into bolt holes 122 formed on the flange 121 and threadly engaged with thread holes 124 formed in the cam pulley 102, and then the ring gear 114 is integrally connected with the cam pulley 102. Since the ring gear 114 is connected with the cam pulley 102 with the ring gear 114 being fitted into the cam pulley 102, the ring gear 114 is positioned in the center of the carrier 112 through the cam pulley 102 and the bearings 120*a* and 120*b*. As a result, the ring gear 114 can be fitly meshed with the planetary gears 113.

Collars 126 and 127 are formed on the inner surface of the cam pulley 102 and the outer surface of the carrier 112. The axial movement of the bearings 120*a* and 120*b* is restricted by the collars 126 and 127, the end portion 114*a* of the ring gear 114 and washers (intermediate members) 128 fasted together by the bolts 118. Specifically, the collar 126 is projected on the rear end of the carrier 112 and the collar 127 is projected on the center in the front and rear direction of the cam pulley 102. The rear side bearing 120*b* is provided between these collars 126 and 127, and therefore the axial movement of the bearing 120*b* is restricted. The front side bearing 120*a* is provided between the collar 127, the end portion 114*a* of the ring gear 114 and the washers 128, and therefore the axial movement of the bearing 120*a* is also restricted.

A seal member 157 is fitted into the inner surface of the front end (connecting portion) 114*b* of the ring gear 114, and the rear end of the electric motor 130 is fitted into the inner side of the seal member 157.

Figure 12:
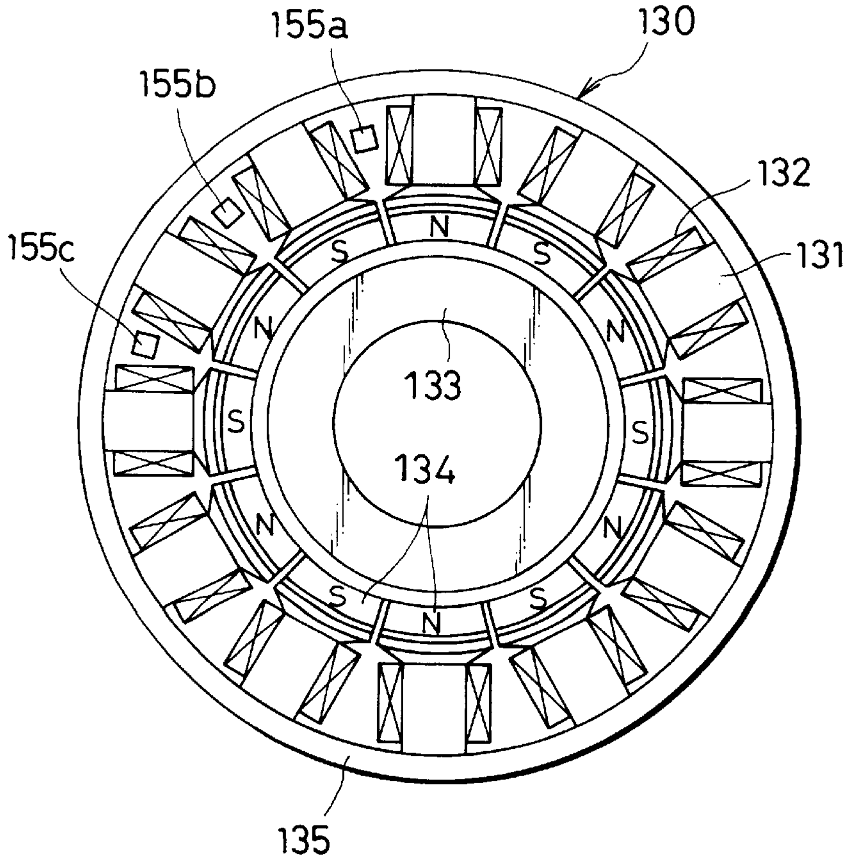
FIG. 12 is a front view of an electric motor.

The electric motor 130 includes a stator 131 on which stator coils 132 for generating a magnetic field are wound and a rotor 133 having permanent magnets 134. The stator 131 which is formed to be a ring is secured by bolts and the like to a casing 135 which is connected through a bracket 104 with the engine body. As shown in FIG. 12, three Hall elements 155*a*–155*c* are arranged between the adjacent stator coils 132. The Hall elements 155*a*–155*c* detect the magnetic poles of the permanent magnets 134 which rotate together with the rotor 133. The rotation angle of the rotor 133 is thus detected by the Hall elements 155*a*–155*c* sequentially detecting the magnetic poles of the magnets 134.

The rotor 133 is installed in an inner side of the stator 131. The front and rear ends of the rotor 133 are respectively connected through thrust bearings 137*a* and 137*b* with the casing 135 and the carrier 112 such that the rotor 133 is rotatably supported in the inner circumference side of the stator 131.

Referring to FIG. 10, the rotor 133 is integrally provided with a bearing supporting portions 133*a* and 133*b* for the bearings 137*a* and 137*b*. The supporting portions 133*a* and 133*b* respectively includes supporting surfaces 138 for supporting the bearings 137*a* and 137*b*. The carrier 112 and the casing 135 are respectively provided with a washer 136 and a ring member 139 both of which work as supporting portions for the bearings 137*a* and 137*b*. The washer 136 and the ring member 139 include inner circumference supporting members 136*a* and 139*a* for the bearings 137*a* and 137*b*. Namely, the respective bearings 137*a* and 137*b* are supported with the bearings being fitted into the supporting surfaces and members 138 and 136*a* and 139*b*, and therefore the rotor 133 is positioned at its center through the bearings 137*a* and 137*b*. As a result, a proper air gap can be obtained between the stator 131 and the permanent magnets 134.

The ring member 139 is secured to the casing 135 by a knock pin or the like. The washer 136 is attached to the carrier 112 by being fitted with pressure into the supporting shafts of the planetary gears 113. Thus, the rotor 133 is positioned at its center with high accuracy. In order to avoid leakage of magnetic flux, the supporting portion 133*a* and 133*b* of the rotor 133, the washer 136, the ring member 139 and the like are made out of non-magnetic material such as aluminum.

Referring to FIG. 9, a shaft body 142 is penetrated into the rotor 133 and is provided co-axially with the camshaft 101. The front end of the shaft body 142 is supported by the casing 135, and the rear end of the shaft body 142 is penetrated into the carrier 112 through the through hole 116 and supported by the camshaft 101. Namely, the casing 135 is provided with the through hole 151 having a diameter portion 151*a* and a small diameter portion 151*b*, and the shaft body 142 is inserted into the through hole 151. The shaft body 142 is provided with a collar 143 at the front portion thereof, and the collar 143 is inserted into the large diameter portion 151*a*. Friction plates 152 are respectively positioned on the front and rear sides of the collar 143. A cover plate 153 is attached onto the front end of the casing 155. The collar 143 is sandwiched through the friction plates 152 between the cover plate 153 and the casing 135 such that the front end of the shaft body 142 is prohibited from rotating to the casing 135. On the contrary, the rear end of the shaft body 142 is inserted into the recess portion 101*a* and is supported through a bush 154 so as to rotate to the camshaft 101.

The front end of the shaft body 142 projects outside through an opening 153 of the cover plate 153, and the projected portion of the shaft body 142 works as an oil inlet portion. Namely, the shaft body 142 is provided with a passage 142*a* therein for supplying lubricating oil to a portion between the shaft body 142 and the slide member

144 and/or a portion between the shaft body 142 and the bush 154. The lubricating oil is supplied through the oil inlet portion to the passage 142*a*.

The cylindrical slide member 144 is arranged on the outer circumference of the shaft body 142. Splines 145 or serrations are correspondingly formed in an axial direction on the outer circumference of the shaft body 142 and the inner circumference of the slide member 144. By the engagement of the splines 145, the slide member 144 can move in the axial direction or the front and rear direction under the condition that its rotation is prohibited.

A feeding thread 146 like a helical spline is formed on the outer circumference of the front portion of the slide member 144. The rotor 133 is provided with a thread 147 formed on the inner circumference thereof. On the other hand, the rear portion of the slide member 144 is located in the center of the planetary gear mechanism 110, and the sun gear 111 is formed integrally on the outer circumference of the rear portion of the slide member 144. The sun gear 111, the respective planetary gears 113 meshed with the sun gear 111 and the ring gear 114 meshed with the planetary gears 113 are all helical gears.

Figure 13:
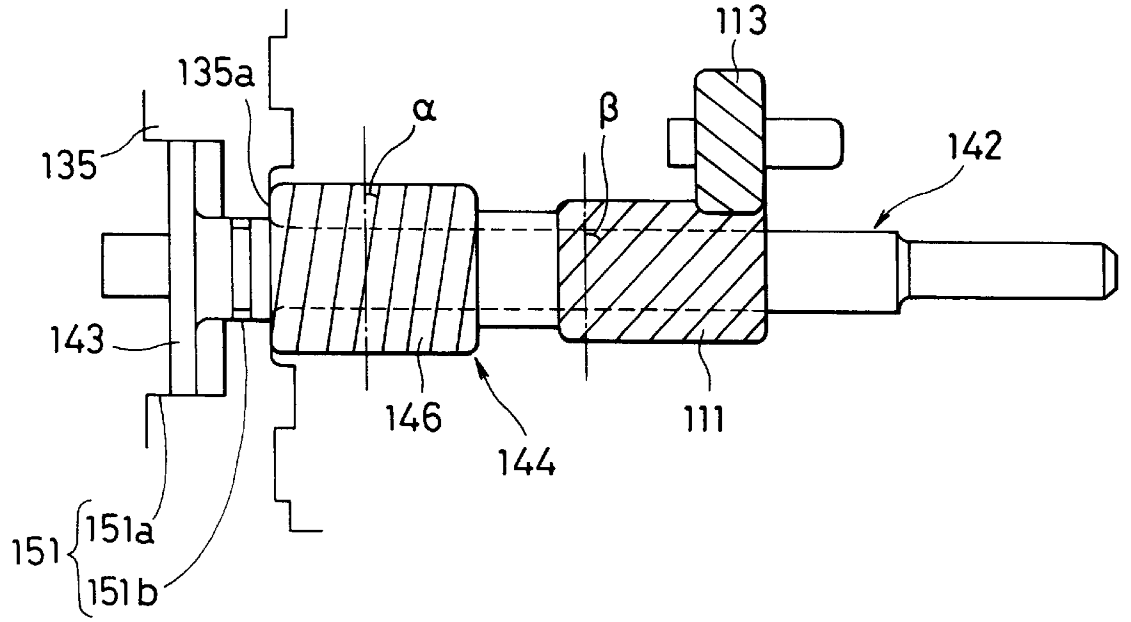
FIG. 13 is a view showing the feeding thread of a slide member and the lead angle of a sun gear in the third embodiment of the present invention.

Referring to FIG. 13, in the slide member 144, the slant angle of a helical groove or the lead angle a of the feeding thread 146, which is an angle to the axis vertical to the axial direction of the slide member 144, is provided to be smaller than the slant angle of a helical groove or the lead angle β of the sun gear 111. Accordingly, the rotation of the rotor 133 is reduced and transmitted to the planetary gear mechanism 110, and the stopping condition of the rotor 133 can be maintained against a thrust force applied from the camshaft side to the slide member 144 when the electric motor 130 is not driven to be stopped.

The electric motor 130 is controlled by a controller (not shown) which totally controls the engine. Namely, rotational phases of the camshaft 101 are determined in advance such that optimal valve timings can be obtained according to the driving conditions. And the controller controls the current applied to the stator coil 132 of the motor 130 such that the rotational phase of the camshaft 101 is shifted according to the driving conditions. During the control operation, based on the magnetic pole detection by the Hall elements 155*a*–155*c* of the electric motor 130, the rotation angle of the motor 133 is obtained. As a result, the present cam angle is detected and the rotational phase is adjusted.

In operation, during a non-phase-shifting operation, the electric motor 130 is stopped and the sun gear 111 of the planetary gear mechanism 110 is fixed. As a result, the cam pulley 102, the ring gear 114 connected with the cam pulley 102 and the camshaft 101 connected with the carrier 112 are all together rotated with a speed ratio. The speed ratio is determined by the gear ratio of the ring gear 114 and the planetary gears 113. Further, a pulley ratio of the crank pulley and the cam pulley 102 is predetermined taking into consideration of the speed ratio. Thus, the camshaft 101 rotates with a predetermined speed ratio against the crankshaft.

During a phase-shifting operation, the rotor 133 of the electric motor 130 is rotated, the rotation of the rotor 133 is converted into the axial direction movement of the slide member 144 and the sun gear 111 by the feeding threads 146 and 147. Then, the axial direction movement of the slide member 144 and the sun gear 111 is converted into the rotation force by the helical gears including the sun gear 111 and the like such that the rotation force is applied from the sun gear 111 to the planetary gears 113. Accordingly, the speed ratio between the ring gear 114 and the carrier 112 is changed in comparison with the condition of the sun gear 111 being fixed, and, as a result, the rotational phase of the camshaft 101 is shifted so as to vary the valve timing.

The rotational phase control apparatus of the third embodiment includes two units which is a first unit and a second unit. The first unit includes the cam pulley 102, the carrier 112 and the ring gear 114 all of which are connected and fixed to the camshaft 101. The second unit includes the casing 135, the electric motor 130, the shaft body 142, the slide member 144 and the like. The electric motor 130, the shaft body 142, the slide member 144 and the like are attached to the casing 135. The second unit is connected and fixed through the bracket 104 to the engine body. Accordingly, each of the first and second units are at first sub-assembled, and then the respective first and second units are installed into the engine.

In the assemble of the first unit, for example, the bearing 120*b*, the cam pulley 102, the bearing 120*a* and the washer 36 are sequentially assembled to the carrier 112 to which the planetary gears have not been assembled. Thereafter, the ring gear 114 is fitted into and secured to the cam pulley 102. Then, the planetary gears 113 and the washer 136 are assembled and then the bearing 137*b* is finally assembled. Thus, the first unit is obtained in which the cam pulley 102 and the ring gear 114 are rotatably supported outside of the carrier 112 and the through hole 116 in which the sun gear 111 is received is provided.

In the assemble of the second unit, at first, the ring member 139, the bearing 137*a* and the electric motor 130 are sequentially assembled to the casing 135. Thereafter, the shaft body 142 is inserted into the casing 135 through the through hole 151 and the friction plate 152 and the cover plate 153 are attached. At this time, the cover plate 153 is temporally attached. At the end, the slide member 144 is inserted into the shaft body 142 and the feeding thread 146 of the slide member 144 is threadly engaged with the thread 147 of the rotor 133. Thus, the second unit is obtained.

When the rotational phase control apparatus is assembled to the engine body, at first, the first unit is attached to the camshaft 101. Specifically, the front end of the camshaft 101 is inserted into the through hole 116 of the carrier 112 and the first unit is attached to the end of the camshaft 101. Thereafter, carrier 112 is secured through the bolts 118 to the camshaft 101.

After the attachment of the first unit, the second unit is attached to the camshaft 101 and the first unit. Specifically, the front end (the right end in FIG. 9) of shaft body 142 is inserted through the through hole 116 of the carrier 112 into the recess portion 101*a* of the camshaft 101. And the second unit is integrated with the first unit with the sun gear 111 of the slide member 144 being meshed with the planetary gears 113. At this time, the seal member 157 is attached in advance to the front end of the ring gear 114, and, in the integration of the two units, the rotor 133 is fit into the bearing 137*a* and the seal member 157. After the second unit is integrated with the first unit, the casing 135 is secured to the bracket 104.

After the respective first and second units are attached to the engine body, the rotational phase is initially adjusted by rotating the rotor 133, the cam pulley 102 and the shaft body 142. At this time, since the cover plate 153 is removed from the casing 135 such that the collar 143 is not sandwiched by the friction plates 152, both the shaft body 142 and the slide member 144 are integrally rotatable with respect to the casing 135. Thus, the initial adjustment of the rotational phase can be initially adjusted.

In the third embodiment, a plurality of elongated adjustment holes 156 are provided around the through hole 151 in the casing 135. The rotor 133 can be rotated by the tools or the like which are inserted into the adjustment holes 156.

After the initial adjustment of the rotational phase, the cover plate 153 is secured to the casing 135 such that rotation of the shaft body 142 and the slide member 144 to the casing 135 is restricted. Thus, the initial adjustment is over and the assemble of the rotation phase control apparatus is completed.

According to the third embodiment, since the planetary gear mechanism 110 is employed, the apparatus can be downsized.

Further, the rotational phase control apparatus is provided with the first unit, which includes the cam pulley 102, the carrier 112, the ring gear 114 and the like, and the second unit, which includes the electric motor 130, the shaft body 142, the slide body 144 and the like. Therefore, the apparatus can be easily assembled to the engine body with the first and second units being integrated. As a result, according to the embodiment, a compactness of the apparatus and a good assemble property can be obtained.

A good maintenance property can be also obtained, since the first and second units can be respectively removed when the maintenance is necessary. For example, when the timing belt 103 is attached or removed, the belt 103 can be easily attached or removed to or from the cam pulley 102 just by attaching or removing the second unit even if the electric motor is so large to be an obstacle. Accordingly, in comparison with the conventional apparatus in which many components must be sequentially assembled, the apparatus of the embodiment has a much better maintenance property.

In the third embodiment, as explained above, the carrier 112 is connected with the camshaft 101 with the camshaft 101 being fit into the carrier 112. However, instead of this construction, the carrier 112 may be connected with the camshaft 101 with the camshaft 101 being just contacted with the carrier 112. In the case that the carrier 112 is connected with the camshaft 101 with the camshaft 101 being fit into the carrier 112, the carrier 112 becomes longer in an axial or front and rear direction for the fitting portion of the camshaft 101. As a result, by utilizing the longer carrier 112, a plurality of the bearings 120*a* and 120*b* for supporting the cam pulley 102 on the carrier 112 can be attached in series. Accordingly, the carrier 112 can be easily positioned at its center, and enough bearings can be attached.

Next, a fourth embodiment of the present invention will be explained with reference to FIG. 14. In the first unit of the third embodiment, the cam pulley 102 is rotatably provided on the outer circumference of the carrier 112 and the ring gear 114 is attached with the front end of the cam pulley 102. On the contrary, in the fourth embodiment, the ring gear 114 and the carrier 112 are exchanged each other in an inner and outer direction. There will be explained only the different structures between the third embodiment and the fourth embodiment with reference to FIG. 14.

The ring gear 114 is integrally provided with a through hole 160 for receiving the camshaft. The front end of the camshaft 101 is fitted into the rear side of the through hole 160, and the ring gear 114 is secured to the camshaft 101. The cam pulley 102 is attached on the outer circumference of the through hole 160 of the ring gear 114, and the cam pulley 102 is rotatably supported through the bearings 120*a* and 120*b* by the ring gear 114. Further, the carrier 112 is connected with the front end of the cam pulley 102, and the planetary gears 113 supported by the the carrier 112 are meshed with the ring gear 114 and the sun gear 111.

According to the fourth embodiment, during the non-phase shifting operation, the sun gear 111 of the planetary gear mechanism 110 is fixed, the cam pulley 102, the planetary gears 113 of the carrier 112 supported by the cam pulley 102, and the ring gear 114 are all rotated. Thus, the camshaft 101 is rotated with a predetermined speed ratio to the crankshaft.

During the phase shifting operation, the rotor 133 of the electric motor 130 is rotated and the rotation of the rotor 133 is converted into the axial direction movement of the slide member 144 and the sun gear 111. Then the rotation force is applied from the sun gear 111 to the planetary gears 113. Thus, the speed ratio of the ring gear 114 to the carrier 112 is changed, in comparison with the case of sun gear 111 being fixed, such that the rotational phase of the camshaft 101 is changed to change the valve timing.

Figure 14:
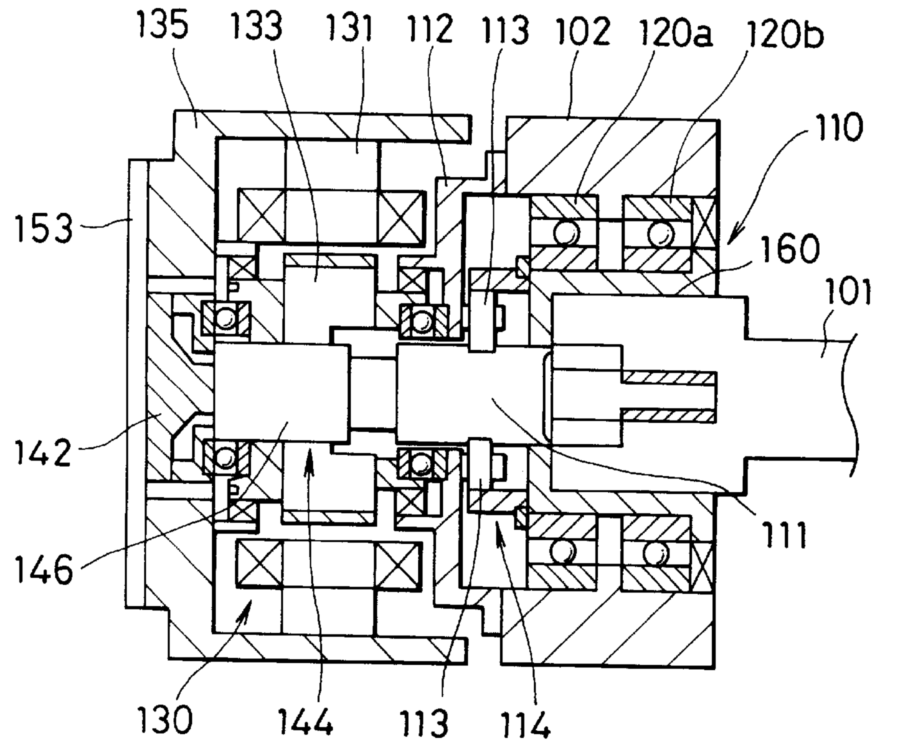
FIG. 14 is a sectional view of an apparatus for controlling a rotational phase according to a fourth embodiment of the present invention.

The apparatus shown in FIG. 14 is functionally as same as that shown in FIG. 9. However, the apparatus in FIG. 9 is more advantageous in a size or a space than that in FIG. 14. Namely, the bearings 120*a* and 120*b* and the carrier 112 are provided on the outer circumference of the ring gear 114 in the apparatus of FIG. 14, and the cam pulley 102 is only provided on the outer side of the ring gear in the apparatus of FIG. 9. Accordingly, if the sun gear 111, the planetary gears 13 and the ring gear 114 employ the same structures in the both apparatus, the apparatus of FIG. 9 is smaller in a radius direction than that of FIG. 14.

Next, a fifth embodiment of the present invention will be explained with reference to FIGS. 9, 13, 15 and 16. A DOHC engine is provided with intake valves and exhaust valves both valves are operated by respective camshafts. In case that a rotational phase control apparatus is applied to the DOHC engine, the apparatuses are applied to the respective camshafts operating the intake and exhaust valves.

Figure 15:
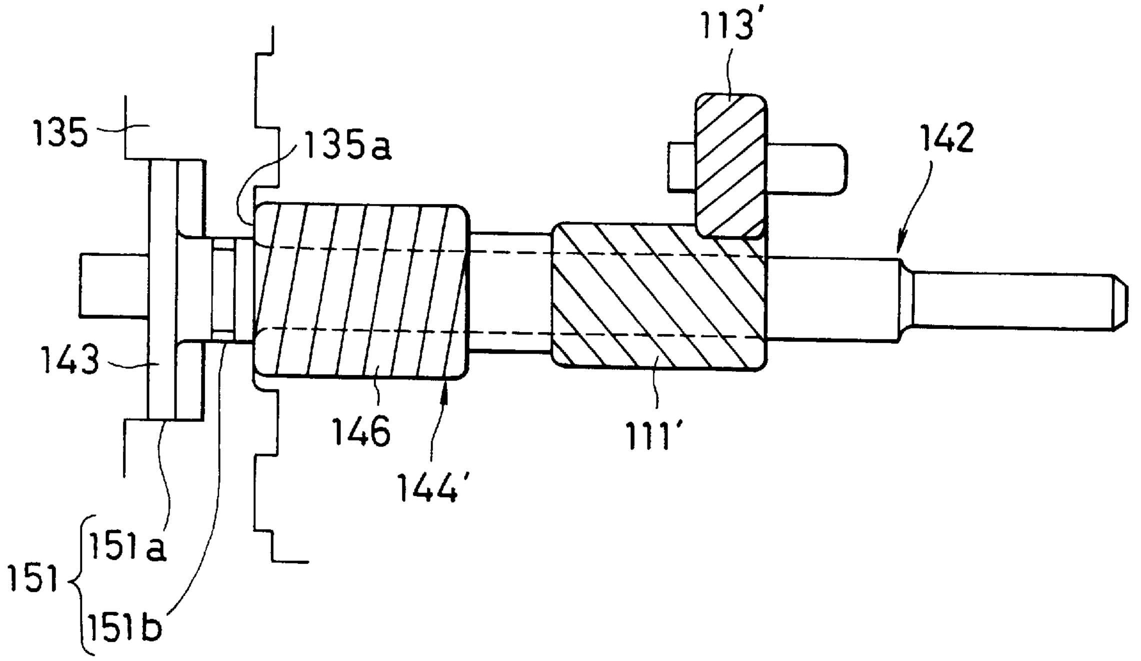
FIG. 15 is a view showing the feeding thread of a slide member and the lead angle of a sun gear in case where an apparatus for controlling a rotational phase is applied to an exhaust side of an DOHC engine according to a fifth embodiment of the present invention.

In the fifth embodiment, the rotational phase control apparatus applied to the camshaft of the intake valves employs the structures shown in FIGS. 9 and 13, and the apparatus applied to the camshaft of the exhaust valves employs the structures shown in FIGS. 9 and 15. In the apparatus of the intake side, an initial adjustment is carried out such that the front end of the slide member 144 is contacted with the stopper 135*a* of the casing 135 when the intake valve timing is mostly retarded as shown in FIG. 13. On the other hand, as shown in FIG. 15, the apparatus of the exhaust side is provided with a sun gear 111' and planetary gears 113' both of which have helical structures whose slant angles are opposite to those of FIG. 13. In the apparatus of the exhaust side, an initial adjustment is carried out such that the front end of the slide member 144' is contacted with the stopper 135*a* of the casing 135 when the exhaust valve timing is mostly advanced as shown in FIG. 15.

Figure 16:
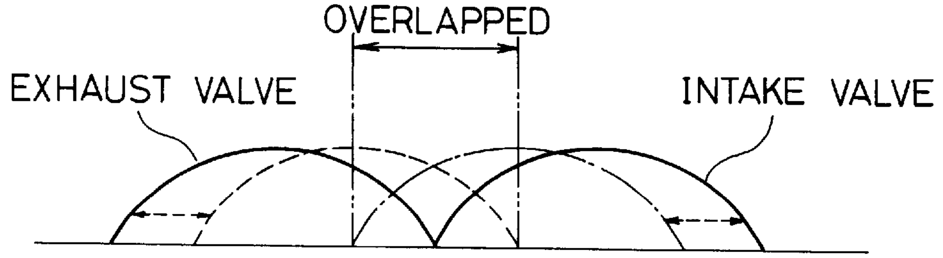
FIG. 16 is a view showing an example of a valve timing of an intake valve and an exhaust valve.

According to the fifth embodiment, an overlapped period of the exhaust valve and the intake valve shown in FIG. 16 can be shortened most under the initial adjustment condition and therefore a burning of fuel can be stabilized at the start of the engine or the like. Further, since the respective slide members 144 and 144' of the intake side and the exhaust side are provided so as to contact with the fixed stopper 135*a*, the abrasion of the slide members 144 and 144' can be advantageously avoided. Namely, suppose the slide members 144 and 144' are provided so as to contact with the camshaft (or the rear side of the engine) in the initial adjustment. In this case, abrasions of the slide members 144 and 144' and the camshaft 101 possibly occur because of the rotation of the camshaft 101. However, the abrasions can be avoided by employing the structures shown in FIGS. 13 and 15.

In the embodiments of the present invention, the electric motor 130 is employed as a drive source. The apparatus, in which the initial adjustment is carried out, has a specific advantageous effect when the electric motor is employed (see FIGS. 13 and 15).

Namely, the overlapped period of the intake valve and the exhaust valve needs to be most shortened at the starting or idling time of the engine. Therefore, in the respective rotational phase control apparatuses, the initial adjustment conditions need to be maintained at the starting or idling time. However, in the apparatus of the exhaust side where the valve timing is most advanced at the initial adjustment condition, the slide member 144' tends to move toward the retard direction by the reaction force from the valves during the engine operation, and this phenomenon needs to be avoided. Regarding this, the rotational phase control apparatus with the electric motor 130 can surely avoid such movement of the slide member 144' just after the starting of the engine by driving the motor 130. Suppose that a hydraulic motor is employed instead of the electric motor as a driving source. In this case, such movement of the slide member can not be avoided since the hydraulic pressure needs a certain time to be raised enough. Accordingly, in the apparatus in which such initial adjustment is necessary, providing an electric motor as a driving source is advantageous.

Figure 17:
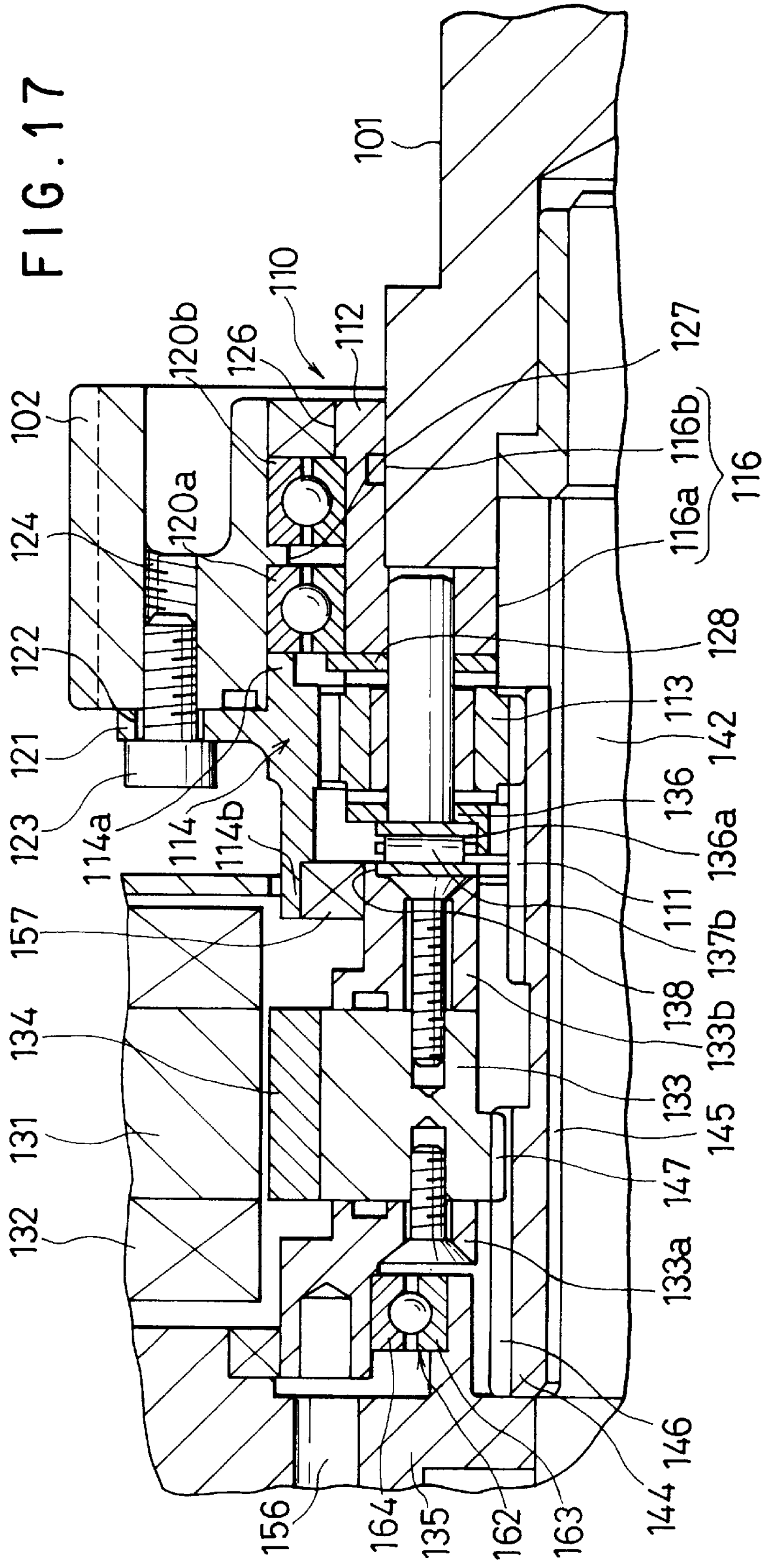
FIG. 17 is a partially enlarged sectional view of an apparatus for controlling a rotational phase according to a sixth embodiment of the present invention.

A sixth embodiment of the present invention will be explained with reference to FIG. 17. In the sixth embodiment, a ball bearing 162 is employed instead of the thrust bearing 137*a* at the front side of the rotor 133. According to the embodiment, the movement of the rotor 133 in the radius direction is restricted by the ball bearing 162. Therefore, the phenomenon that rotor 133 is drawn in the radius direction by the magnetic force of the permanent magnets 134 and the rotor 133 is forced to be not positioned at its center can be avoided. Further, the ball bearing 162 can restrict the thrust force and can properly receive the axial force including the reaction force from the camshaft 101. Moreover, since the inner ring 163 and the outer ring 164 of the ball bearing 162 respectively contact with the casing 135 and the rotor 133, the rotor 133 is thus positioned at its center corresponding to the center of the casing 135. As a result, the rotor 133 can be positioned with high accuracy and the abrasions of the supporting portions can be reduced. The increase of the friction loss can be reduced between the threads 146 and 147. As a result, the power for rotating the motor and the like can be reduced.

Although the present invention has been explained with reference to specific, preferred embodiments, one of ordinary skill in the art will recognize that modifications and improvements can be made while remaining within the scope and spirit of the present invention. The scope of the present invention is determined solely by appended claims.

What is claimed is:

1. An apparatus for controlling a rotational phase comprising:

an input member provided so as to be rotatable with respect to a fixed side;

an output member co-axially provided with the input member so as to be rotatable with respect to the fixed side;

a planetary gear mechanism co-axially provided with the input member and the output member for connecting the input member with the output member, said planetary gear mechanism including three elements which are a sun gear, a planetary carrier supporting planetary gears and a ring gear;

drive means connected with one of the three elements of the planetary gear mechanism for shifting said rotational phase, said drive means including two members which are rotatable with respect to each other;

one of the input member and the output member being connected with the ring gear, the other of the input member and the output member being connected with the planetary carrier; and said two members of the drive means being co-axially provided with the planetary gear mechanism, one of the two members being secured to the fixed side and the other of the two members being connected with the sun gear.

2. An apparatus according to claim 1, wherein said another member of the drive means is a rotor, and said apparatus further comprises speed reducing means provided between the rotor and the sun gear of the planetary gear mechanism, said rotor, sun gear and speed reducing means being all co-axially provided.

3. An apparatus according to claim 2, wherein said speed reducing means is movable in an axial direction and includes a slide member which is provided so as to penetrate into the center of the rotor, the slide member and a corresponding portion of the rotor are respectively provided with feeding threads for converting a rotation of the rotor into an axial movement of the slide member, the sun gear is attached to the slide member and includes a helical gear for converting the axial movement into a rotation, and the feeding threads and the helical gear respectively have lead angles such that a speed of the rotor is reduced and transmitted to the planetary gear mechanism.

4. An apparatus according to claim 3, wherein said lead angles of the feeding threads are provided to be smaller than that of the helical gear and also provided to be equal to or less than lead angles at which a rotation force, corresponding to a thrust force, and a friction force are balanced.

5. An apparatus according to claim 2, wherein said apparatus further comprises a secondary planetary gear mechanism provided between the planetary gear mechanism and the drive means for reducing the speed of the rotor of the drive means and transmitting the reduced speed to the sun gear of the planetary gear mechanism.

6. An apparatus according to claim 1, wherein said apparatus further comprises clutch means for switching between a first condition and a second condition, said first condition being that the two members of the drive means are allowed to be rotatable with respect to each other and said second condition being that the two members of the drive means are not allowed to be rotatable with respect to each other, said clutch means being operated such that the two members of the drive means are in the second condition when the drive means is stopped.

7. An apparatus according to claim 1, wherein said input member is a pulley connected through a transmitting member with a crankshaft of an engine, said output member is a camshaft for driving valves, the pulley and the camshaft are co-axially provided to be rotatable with respect to the fixed side which is an engine body, and the one of the two members of the drive means is secured to the engine body.

8. An apparatus according to claim 7, wherein said pulley is connected with the ring gear of the planetary gear mechanism, and the camshaft is connected with the planetary carrier of the planetary gear mechanism.

9. An apparatus according to claim 1, wherein said drive means is an electric motor, and the two members of the drive means are a stator with coils for generating a magnetic field and a rotor with a permanent magnet, said stator being secured to the fixed side.

10. An apparatus according to claim 9, wherein said electric motor is a step motor whose rotor is connected through the speed reducing means with the sun gear of the planetary gear mechanism.

11. An apparatus according to claims 1, wherein said drive means is a hydraulic motor, and the two members of the drive means are a casing member which has a hydraulic chamber therein and a rotor located in the casing member.

* * * * *